Aug. 10, 1943.     J. H. NELSON     2,326,161
OIL DISTRIBUTOR ASSEMBLY
Filed July 24, 1942
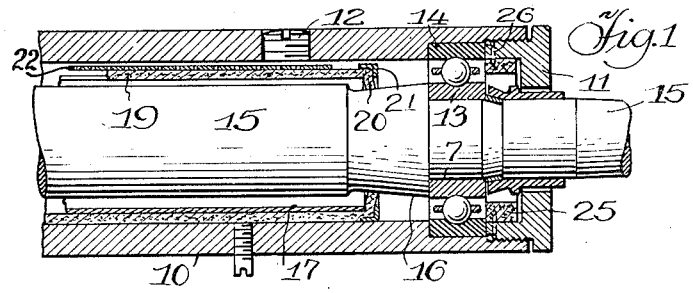
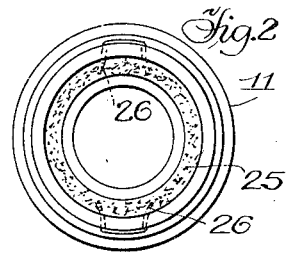
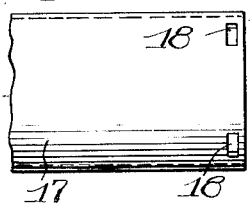
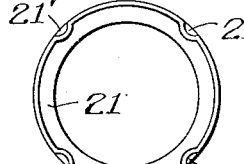
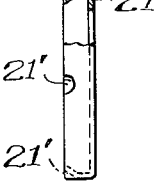
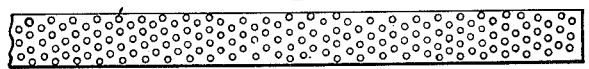
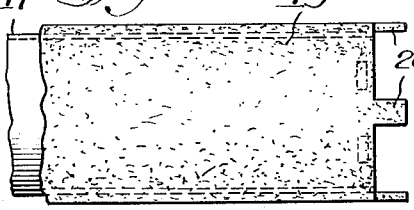
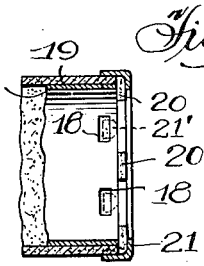
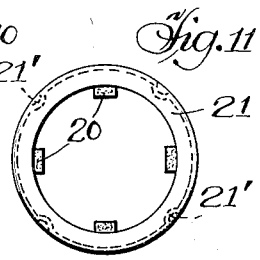
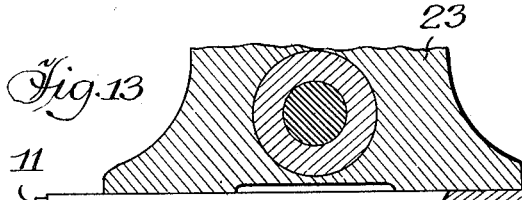
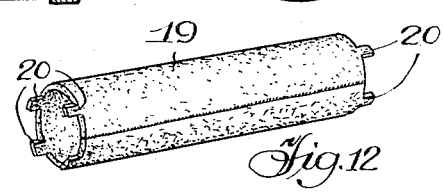
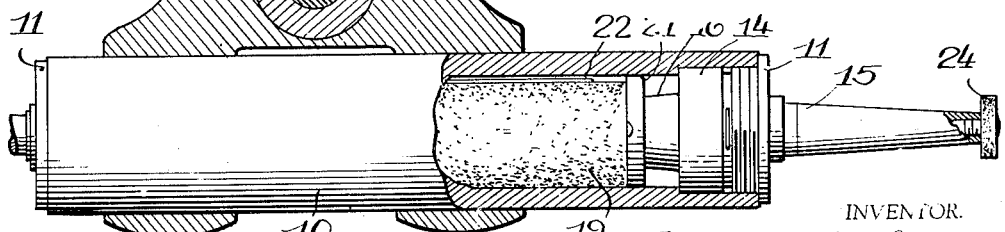
INVENTOR.
James Holly Nelson
BY Chritton, Wiles, Davies & Hirschl, Attys.
Witness: Chas. X. Kursh Patented Aug. 10, 1943

2,326,161

UNITED STATES PATENT OFFICE 2,326,161

OIL DISTRIBUTOR ASSEMBLY

James Holly Nelson, Racine, Wis., assignor to The Dumore Company, Racine, Wis., a corporation of Wisconsin Application July 24, 1942, Serial No. 452,211

6 Claims. (Cl. 308—187)

This invention relates to improvements in oil distributor assemblies for shafts rotating at high speeds.

An illustration of such shafts is found in high speed grinders in which the spindle may rotate at speeds as high as 30,000 to 40,000 revolutions per minute.

It has proven difficult heretofore to properly lubricate the ball bearings of such a spindle, due presumably to centrifugal force which in some cases causes the oil to be thrown to the outer raceway, resulting in overheating of the inner raceway with resultant damage to the bearing to the extent of requiring replacement. Also, even a moderate frictional pressure on the rotating shaft, such for example as too much pressure of a part of the absorbent material which conveys the oil by capillary attraction, will overheat the shaft at the higher speeds.

One object of the invention is to overcome these difficulties and disadvantages by providing effective means for conveying the lubricating oil to the bearing so as to supply oil to both the inner and outer raceways.

Another object is to make practical use of felt or other porous or fibrous material, as the oil conveying means by mounting a felt tube out of contact with the rotating spindle and so supporting a tab, tabs or extensions of the felt that the same rest lightly on the flaring portion of the spindle and supply oil thereto without substantially heating the same.

An additional object is to provide means for preventing loss of the oil through the joint where the cap is screwed into the end of the quill tube.

Other objects will be apparent from the more detailed description given of the illustrative embodiment of the invention disclosed in the drawing.

Fig. 1 of the drawing is a central section through one end of the quill tube or quill;

Fig. 2 is an inside view of the end cap;

Fig. 3 is an elevation of one end of a sheet metal tubular member;

Fig. 4 is an end elevation thereof;

Fig. 5 is an elevation of an end retainer or cup;

Fig. 6 is a central section thereof on the line 6—6 of Fig. 5;

Fig. 7 is a plan view of a perforated strip of metal;

Fig. 8 is an end view thereof;

Fig. 9 is an end elevation of the sheet metal member of Fig. 3 with a felt tube covering the same;

Fig. 10 is a sectional elevation of the same end with the retainer in place;

Fig. 11 is an end view thereof;

Fig. 12 is a perspective view of the felt tube surrounding its sheet metal liner; and Fig. 13 is a sectional elevation of the complete quill shown mounted in part of the base of the grinder.

The assembly includes a cylindrical housing or metal tube 10 known as a quill tube or quill, and ends being closed by screw threaded caps 11. The quill has an opening normally closed by an oil plug 12 through which the lubricating oil is introduced.

Ball bearings are mounted in each end of the quill and as they are duplicates, each comprising inner and outer raceways 13, 14, and as certain other end parts of the structure are the same, only the right hand end of the structure is shown in most of the views.

The inner raceway, shown in Fig. 1, is mounted on a reduced extension on the spindle 15 to the left of which the spindle tapers or flares outwardly at 16. Said spindle is surrounded by an incomplete tubular member of sheet metal 17 bent around as shown in Fig. 4 and provided with a number of circumferential slits 18. This cylindrical member is surrounded by a tube of fibrous material capable of absorbing oil by capillary attraction. It may be made from a sheet of felt, for example, sewn together to form a tube 19, as shown in Figs. 9 and 12. Said tube is provided preferably with one or more tabs 20 at the ends. These extensions, of which there may be any suitable number, are bent inwardly, radially, as shown in Fig. 11 and held in this position by the cup-shaped retainer or rim 21 which is made preferably of sheet metal with struck-in portions 21' designed to snap into the slits 18 and hold the felt tube as well as the cup-shaped retainer in place.

As will be seen, the felt tube spans the opening or gap in the cylindrical member 17 and at this point has superimposed over it a perforated strip of metal 22 of a length preferably less than the length of said cylindrical member.

The felt tube with its metal liner is pushed into the quill in such position that the said perforated strip of metal 22 is adjacent the inner end of the oil opening, which is normally closed by the plug 12. The felt is sufficiently yielding to serve as a somewhat resilient support for said strip whereby the same is pressed against the inner wall of the quill 10 with sufficient friction to retain the parts in position. As previously stated, the end retainers 21 hold both ends of the felt tube in place and thus prevent shrinkage and also hold the outer parts of the tabs in radial position whereas the inner parts, which are slightly longer than the distance to the tapering surface 16 of the spindle, are bent a little to wipe against said surface as it rotates. The pressure applied, however, is sufficiently light to avoid heating the spindle.

The complete assembly is shown in Fig. 13 in which the quill 10 is detachably mounted in a casting 23 which forms part of the base of a suitable electric grinder, i. e. an electric motor having a belt connection to a pulley (not shown) on the left hand end of the spindle. At the other end of the spindle may be mounted any one of a number of grinders 24 of different sizes. The one shown is of small diameter, being intended to grind the inner wall of an opening having a diameter of only a fraction of an inch.

When oil is supplied through the said opening, it travels along the perforated strip 22 which, as shown in Fig. 8, is curved somewhat to form a channel, the oil flowing through the various perforations and being absorbed by the wick and hence conveyed to both ends and to the tabs 20 by capillary attraction, even though the rotating spindle is not in horizontal position but may be tilted up or down somewhat as is often the case where an electric grinder is mounted on a lathe. More specifically, the oil is thus applied by said tabs 20 to the tapering part 16 at each end of the spindle and when the latter is rotating, particularly when it is rotating at high speeds, it works toward the larger diameter and reaches the ball bearings. The large diameter of the tapered portion is preferably as large as or slightly larger than the outside diameter of the inner raceway. It is believed that the oil is thrown off in the form of a mist or oily fog which lubricates not only the balls but both of the raceways. At any rate, the lubrication is effective and overheating is prevented. The felt tube, in addition to its capillary action, serves as an oil filter.

With the spindles rotating as rapidly as in the case of electric grinders such as described herein, loss of oil at the ends of the quill cannot be prevented by the use of ordinary end seals as too much heat is developed at the higher speeds. Such loss is effectively prevented, however, in the embodiment of the invention shown herein, by means of the lining or inner ring of soft felt 25 positioned within each end cap 11. As shown in Fig. 2, this felt ring may be held in place by wire clips 26 passing through openings in the flange of said cap, or held by other suitable means.

I claim:

1. An oil distributor assembly for a rotatable spindle, comprising a tube of oil absorbent material, a liner therefor, said tube having a tab at one end extending beyond said liner, and a retainer cup fitting over the end of said tube and gripping said liner to hold said tube in place, said tab extending radially inward beneath said retainer cup with its end free to contact with said spindle.

2. An oil distributor assembly for a rotatable spindle, comprising a tube of flexible, oil absorbent material, a cylindrical member surrounding said spindle over which said flexible member is drawn, said tube having tabs at one end extending beyond said cylindrical member and a retainer member fitting over the end of said tube, said retainer member and said cylindrical member having cooperating detents to permit them to detachably engage each other and hold said tube in place, said tabs extending radially inward beneath said retainer leaving their ends free to touch said spindle.

3. An oil distributor assembly for a rotatable spindle, comprising a tube of felt, a liner therefor comprising sheet material bent to an incomplete cylinder leaving a gap, a plurality of tabs at one end of said tube extending beyond said liner, the latter having circumferential openings near one end, and a retainer ring fitting over said end with detents engaging said openings to hold said tube in position, said tabs extending radially inward to touch said spindle.

4. An oil distributor assembly for a rotatable spindle, comprising a tube of felt, a liner therefor comprising sheet material bent to an incomplete cylinder leaving a gap, a plurality of tabs at one end of said tube extending beyond said liner, the latter having circumferential openings near one end, an end member having means cooperating with said tube and circumferential openings to retain said end member and tube in place, and a strip of perforated material overlying the part of the tube which spans said gap, whereby oil applied to said strip may flow through said perforations and be carried to said tabs by capillary attraction.

5. In combination, a quill tube having ball bearing race ways mounted therein, a rotatable spindle mounted in said race ways, a sheet metal liner positioned concentrically between said spindle and said quill and having a felt tube surrounding the same, said liner having a longitudinal slot therein, a perforated channel member resting on said tube where it overlies said slot, said quill having an oil opening therein adjacent said channel, said tube having an extension thereon bent inwardly to make light contact with said spindle, and a retainer ring detachably secured to the end of said liner to hold said tube in place.

6. An oil distributor assembly comprising a cylindrical housing, a pair of antifriction bearings in said housing, a rotatable spindle mounted in said bearings, said spindle having a flaring portion adjacent each of said bearings over which oil may flow by centrifugal force, a sheet metal liner forming an incomplete cylinder providing a gap, a tube of fibrous material surrounding said liner and having a plurality of tabs at each end, said housing having an oil opening therein in radial alignment with said gap, and a strip of perforated material curved transversely to form a shallow channel overlying said fibrous material opposite said gap, said strip of material being frictionally held in place against the inner wall of said housing, tabs extending from one end of said fibrous material, and a retainer ring having detents cooperating with said liner to hold said fibrous material in place and to hold said tabs in radial position to contact with said flaring portion.

JAMES HOLLY NELSON.